United States Patent Office 2,758,068
Patented Aug. 7, 1956

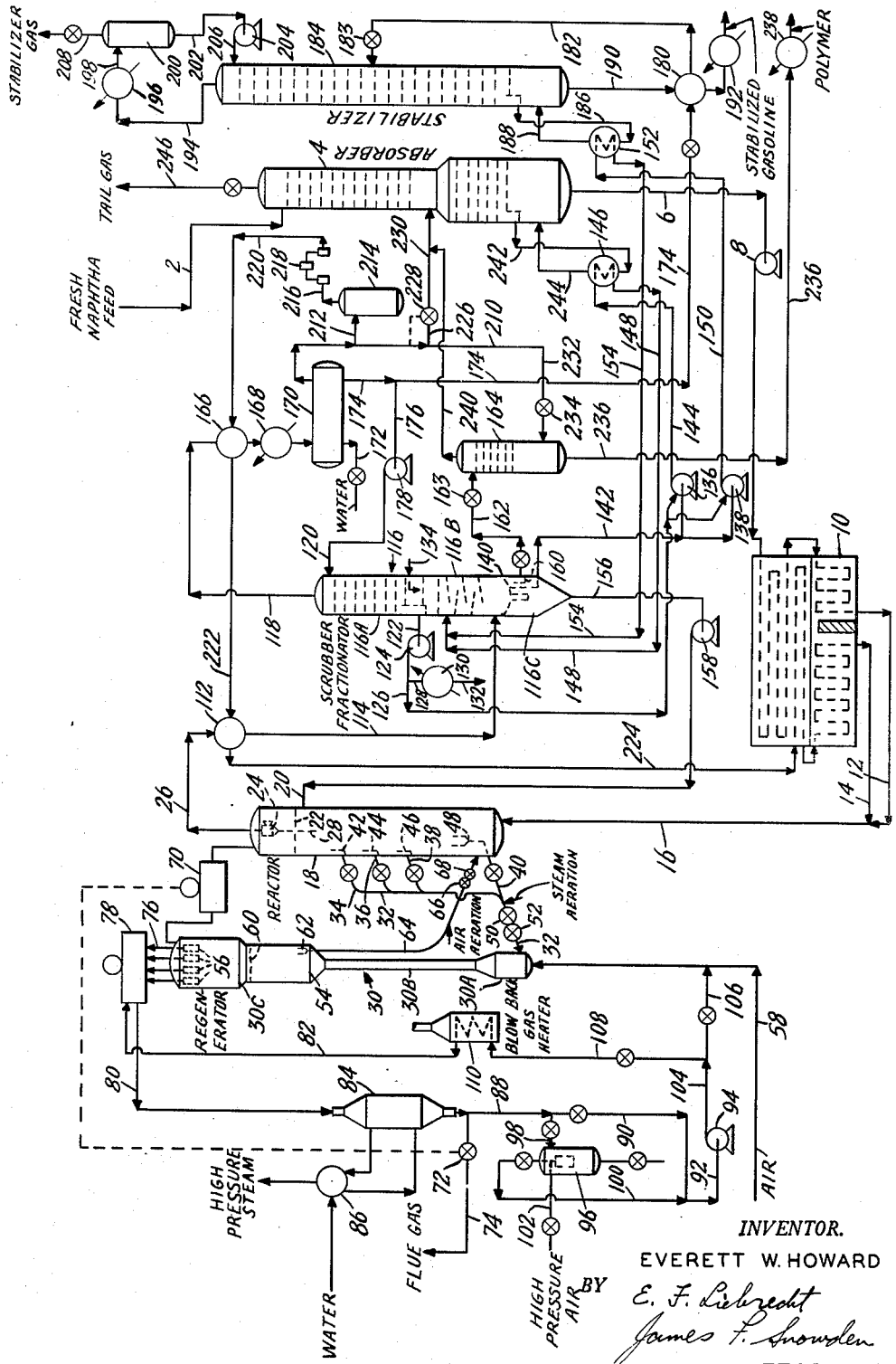

2,758,068
PROCESS FOR UTILIZING THE FLUE GAS IN THE REGENERATION OF THE FOULED CATALYST IN A FLUIDIZED HYDROCARBON CONVERSION SYSTEM

Everett W. Howard, Glen Rock, N. J., assignor to The M. W. Kellogg Company, Jersey City, N. J., a corporation of Delaware Application November 30, 1950, Serial No. 198,375

11 Claims. (Cl. 196—52)

This invention relates to improved catalytic conversion of hydrocarbons, and more particularly to an improved hydroforming system and process of operating the same.

Some of the subject matter disclosed herein for greater clarity is not my invention; this material is described and claimed in the concurrently filed application S. N. 198,376 of Everett W. Howard et al., now Patent No. 2,665,239.

An object of the present invention is to provide an improved process and system for the catalytic conversion of hydrocarbons.

A second object of the invention is to provide an improved process and system for regenerating a hydrocarbon conversion catalyst.

A third object of the invention is to provide an improved method and system for circulating a fluidized catalyst in the conversion of hydrocarbons.

A fourth object of the invention is to provide an improved method and system for circulating a fluidized catalyst in hydroforming.

Other objects of the invention will in part be obvious and will in part appear hereinafter.

This invention relates to a process for the conversion of hydrocarbons which comprises transporting a partially spent fluidized conversion catalyst in dense phase at a relatively low velocity from a conversion bed to a combustion zone, removing a major portion of the deactivating deposits from the catalyst therein in dense phase with a regeneration gas of low oxygen content at a superficial gas velocity below about 5 feet per second, increasing the superficial velocity of the resulting flue gas to above about 10 feet per second, conveying the regenerated catalyst to an elevated collection zone by entrainment as a relatively dilute suspension in the flue gas at a superficial velocity above about 10 feet per second, separating the catalyst from the flue gas essentially by decreasing the superficial gas velocity below the point of substantial entrainment of the catalyst, returning the regenerated catalyst essentially by fluistatic pressure at a relatively low velocity in the dense phase to the conversion bed, cooling a portion of the separated flue gas and forming the regeneration gas by mixing this cooled flue gas with air. In another aspect the invention also concerns the means or system for carrying out the process described.

The invention accordingly comprises the several steps and the relation of one or more of such steps with respect to each of the others, and the apparatus embodying features of construction, combinations of elements and arrangements of parts which are adapted to effect such steps, all as exemplified in the detailed disclosure, and the scope of the invention will be indicated in the claims.

Many advantages result from the present invention as will be apparent to those skilled in the art from the appended description. In carrying the catalyst from the lower combustion section of the regenerator to the upper collection bed at a comparatively high velocity and correspondingly low density of the suspension, the static pressure differential between the lower and upper ends of the regenerator is considerably less than that between the corresponding locations of the reactor. This permits returning the regenerated catalyst to the reactor by the fluistatic or gravity head developed. Gradual acceleration of catalyst in the dense phase combustion bed to a comparatively high velocity and low density suspension eliminates the bumping or vibration and minimizes the erosion encountered in conventional high velocity operations employing the fluidized catalyst technique. By cooling and recycling the high pressure regenerator flue gas as a diluent for the regeneration air, a number of advantages are realized. The power consumed in supplying sufficient gas at high pressure for the gas lift in the regenerator by merely boosting the flue gas pressure slightly is much less than where a gas must be compressed from atmospheric pressure to the regenerator pressure for this operation. Moreover, forming the regeneration gas from a major portion of flue gas and a minor portion of compressed air affords a flexible and very simple method of maintaing a substantially constant regeneration temperature. Transferring the catalyst between the reactor and regenerator at low velocity in dense phase also minimizes erosion in the control and safety valves in the transfer lines.

Although the invention is specifically described in conjunction with hydroforming with a fluid catalyst, the present invention is of broader scope and is readily adaptable to other relatively high pressure petroleum processes employing a finely divided contact material. For instance, it may be used with hydrodesulfurization, hydrogenation, cracking or hydro-cracking (cracking in the presence of hydrogen) with a fluid catalyst, continuous fluid coking operations and the like where the regeneration or reactivation unit is under pressure of at least about 150 pounds per square inch gage (p. s. i. g.). Higher pressures of 400 to 1000 p. s. i. g. are even more desirable.

This invention is best understood by reference to the accompanying drawing in which a hydroformer and associated refining equipment of 7500 barrels per day (B. P. D.) capacity are schematically depicted.

86,070 pounds per hour of 7515 B. P. D. of fresh naphtha of 48.5° API gravity are pumped at 90° F. through line 2 into the top of absorber 4 where this naphtha is used to scrub most of the 4-carbon and all of the higher hydrocarbons out of that portion of the product gases which is not recycled to the hydroforming reactor. 88,828 lbs./hr. (7800 B. P. D.) of enriched naphtha with a gravity of 49.8° API leave the bottom of the absorbing tower at 410° F. and 85 p. s. i. g. through line 6. A pump 8 in the same line feeds the fat naphtha to combinaiton furnace 10 in which it is heated to a temperature of 990° F. and exits through line 12. 4120 mols per hour (M. P. H.) of recycled product gas, from a source to be described later, are heated in a separate coil in the same furnace and leave it at 1100° F. through line 14.

The preheated naphtha and recycle gas are commingled in pipe 16 and fed through a conventional inverted cone and grid distributor into hydroforming reactor 18 at the bottom. This hydroformer is a vertically disposed cylinder extending 70½ feet between the knuckle radii and having an internal diameter of 12 feet. It is lined internally with 4½ inches of refractory insulation of a conventional type. From the distributing grid located at the lower knuckle radius of the reactor where the temperature is 950° F. and the pressure 515 p. s. i. g. the gasiform mixture passes upwardly through a 55½ foot deep bed of any known and suitable hydroforming catalyst in powdered form. The preferred catalyst consists of approximately 10% $MoO_3$ and 3% $SiO_2$ on an alumina gel support. Desirably, the catalyst contains particles of varying sizes averaging about 200 mesh with few if any particles larger than 40 mesh. A typical screen analysis of such a catalyst runs, as follows:

| Screen mesh: | Weight percent |
| --- | --- |
| 100/140 | 11.5 |
| 140/200 | 42.0 |
| 200/325 | 25.5 |
| 325/pan | 21.0 |

The average superficial velocity of the reactants is 0.42 ft./sec. and the space velocity is 0.4 pound of naphtha per hour per pound of catalyst in the bed. Since the catalyst bed is in turbulent motion like a boiling liquid, temperature variations therein are minor and the average bed temperature is 940° F. Near the top of the bed a slurry of catalyst fines in polymer is introduced through line 20 from a source to be disclosed hereinafter. In the upper part of the reactor the gasiform reaction mixture leaves the dense phase catalyst bed which has a density of 39 lbs./cu. ft. under normal operating conditions and passes through the interface 22 into a disengaging zone about 15 feet high in which the gas contains only a very small quantity of entrained catalyst. The reaction products leave the disengaging zone at 930° F. and 500 p. s. i. g. through internal cyclone 24 and pipe 26. Cyclone 24 separates most of the entrained catalyst fines and these are returned to the dense phase by dip leg 28 which projects down below the surface of the reaction bed.

As the hydroforming reaction proceeds, the finely divided catalyst is continuously being withdrawn and added to the reaction bed at rates which differ only by the quantity of carbonaceous deposits on the withdrawn catalyst. The partially spent catalyst which is withdrawn is regenerated by combustion with oxygen-containing gases and the regenerated catalyst is recycled to the bed at the rate of 7530 lbs./hr., giving a catalyst to naphtha feed ratio by weight of 0.088. In view of this extremely small circulation of catalyst to and from regenerator 30, the catalyst in the hydroformer contains a substantially uniform quantity of deposited carbonaceous matter and absorbed hydrocarbons and is therefore of substantially uniform activity throughout the depth of the bed. The 2½ inch spent catalyst transfer line 32 has several valved branch lines 34, 36, 38 and 40 of the same size which communicate with draw-off wells 42, 44, 46 and 48, respectively, in the conversion bed. This permits withdrawing the catalyst at one or more selected levels in the bed in order to avoid any possibility of stratification of the catalyst. In pipe 32 the average flow of partially spent catalyst is 8372 lgs./hr. at an average velocity of 2.2 ft./sec. and a density of 39 lbs./cu. ft. At the inlet of valve 50 the pressure is 516.1 p. s. i. g. The normal pressure drop across safety valve 50 and control valve 52 amounts to 6.4 p. s. i. 4 lbs./hr. of steam or other suitable aeration medium are admitted to transfer line 32 immediately above valve 50 and at higher points along the line to maintain the catalyst in an aerated condition. The transfer line is also tapped above and below valves 50 and 52, respectively, to provide pressure connections for a differential pressure controller which operates to close the safety valve 50 whenever the pressure drop across the two valves is less than 3.0 p. s. i. This prevents any backflow of regeneration gases from reaching the hydroforming reactor 18. Although valve 52 may be arranged for automatic control in response to any suitable reaction condition, it is preferred to have this valve manually regulated by an operator in response to the carbon content of the partially spent catalyst in line 32 from which samples are withdrawn by means (not shown) at regular intervals for carbon analysis. It is recommended that the coke or carbon content of the catalyst in pipe 32 be maintained at about 5.0 percent by weight.

The regenerator 30 consists of three sections designated 30A, 30B and 30C. The lower section 30A is a steel shell of 4¾ feet I. D. which extends upward 5 feet and then tapers inward for the upper 5 feet of its height to 18 inches O. D. Vessel 30A is lined with 4½ inches of a suitable refractory material adapted to withstand the 1100° F. temperature of the combustion zone. Tube 30B is 47 feet long and of 18 inches O. D. and has an internal cross sectional area of 1.15 square feet; stainless steel is preferred as the construction material here. Above it is separating or collecting vessel 30C which contains the upper dense phase bed of the regenerator. This unit comprises a 4 foot tapered section connected to carrier line 30B and surmounted by a 20 foot cylindrical steel hopper chamber of 9 feet I. D. and a settling chamber of 3 feet greater diameter which has an effective length of 17 feet up to the upper knuckle radius. The entire vessel 30C is lined with a 4½ inch thickness of internal refractory insulation. A distribution plate 54 is preferably located at the lower knuckle radius. To separate the regenerated catalyst fines from the flue gas in which they are entrained a plurality of porous filters 56 constructed of stainless steel, ceramics or other suitable porous materials are provided. If desired, suitable cyclones, multiclones or other suitable separation equipment may be substituted. The pressure in the regenerator at the distribution grid (not shown) in vessel 30A is 510 p. s. i. g. and pipe 32 is connected thereto at a point where the pressure is 509.7 p. s. i. g.

Air for regeneration is supplied to combustion chamber 30A under a suitable pressure at the rate of 10,654 lbs./hr. or 370 M. P. H. via line 58 and recycled flue gas is introduced into the same feed line at the rate of 79,200 lbs./hr. (2600 M. P. H.). This flue gas has been cooled to 650° F. and serves to dilute the regeneration air to an oxygen content of 4.27 mol percent in order to maintain the regeneration temperature at about 1100° F. by this dilution. Temperatures above 1150° F. are undesirable as they tend to permanently deactivate the catalyst. In general, temperatures of from about 750 to about 1150° F. are suitable for regeneration of the catalyst and the range from about 1050 to 1100° F. is preferred for the purpose. Control of the regeneration temperature is effected by regulating either the quantity of cooled flue gas recycled to vessel 30A preferably or otherwise the air supply in response to the demands of a temperature controller (not shown) with an element located in the combustion chamber. Thus, an excessive regeneration temperature is brought within the desired limits by further opening of the valve in flue gas line 106 to cool the regeneration gas to a lower temperature or alternatively by throttling the flow through a valve (not shown) in air supply line 58 to reduce the oxygen content of the regeneration gas. Insufficient regeneration temperatures are increased to the normal operating range by automatically operating one of the valves mentioned to decrease the supply of cooled flue gas or increase the air supply. With the regeneration gases passing upward at .2 ft./sec. the density is 20 lbs./cu. ft. in the lower section. While not moving upward at the gas velocity in the lower or main portion of combustion chamber 30A, the finely divided catalyst particles are in dense phase suspension in the regeneration gas and are displaced slowly upward as more spent catalyst is received near the bottom of the chamber from line 32. As the powdered contact material travels up into the conical section of the chamber its velocity gradually increases due to the decreasing cross section of the conduit, and the density of the mixture gradually decreased to a relatively dilute suspension as more and more of the catalyst is entrained in the gas. Substantially all of the catalyst is entrained and moving at a relatively high speed, but lower than the superficial gas velocity by the amount of slippage before the inlet of carrier line 30B is reached. Far less erosion is encountered in this gradual acceleration operation than in the usual case where powdered catalyst is merely dropped into a gas stream flowing at a high velocity. In addition, substantially less catalyst attrition to particles of undesirably small size occurs and the bumping or vibration commonly experienced with high velocity carrier lines is eliminated. These results may be accomplished by maintaining the superficial gas velocity in the widest part of combustion zone 30A at about 0.3 to 5.0 ft./sec. and the catalyst density between about 15 and 42 lbs./cu. ft.; however, the preferred ranges are 1.0 to 3.0 ft./sec. and 15 to 30 lbs./cu. ft.

In tube 30B, the powdered catalyst is carried upward at the comparatively low density of about 1.0 lb./cu. ft. by the gas moving at a superficial velocity of 23 ft./sec. Under these conditions, little variation in pressure exists in tube 30B, where the pressure at the bottom is 508.8 p. s. i. g. and the pressure at the outlet is 508.1 p. s. i. g. The principal function of this section of the regenerator is to conduct the catalyst to a point sufficiently elevated to permit return of the regenerated catalyst to the hydroformer by the gravity head or fluistatic pressure developed by the catalyst. Combustion of the deposits on the catalyst is usually complete in regeneration chamber 30A, but no harm results if the combustion reaction continues in carrier tube 30B or the separation section 30C. The superficial gas velocity in carrier line 30B may vary between about 10 and 50 ft./sec., or higher where erosion is no problem, with catalyst densities ranging from about 0.1 to 10.0 lbs./cu. ft.; the preferred ranges being 10 to 30 ft./sec. velocities and 0.5 to 10.0 lbs./cu. ft. densities.

In the upper bed within vessel 30C, the velocity decreases as the cross section increases in such manner that the velocity is 0.5 ft./sec. and the density is 37 lbs./cu. ft. in the main portion of this section. The catalyst particles of course slow down upon reaching the bed and most of them drop out of entrainment in the flue gas. This is a bed of comparatively high density, therefore, a moderate fluistatic or gravity head is developed. Here the pressure decreases from 506.7 p. s. i. g. at distribution plate 54 to 501.6 p. s. i. g. above the interface 60 which is usually maintained at the level where the regenerator begins to widen out to form the settling section of chamber 30C. Due to the enlarged cross section the superficial gas velocity drops further to 0.27 ft./sec. which causes much of the small amount of catalyst still entrained in the flue gas to separate therefrom. In the bed and the disengaging zone thereabove, over 90 and usually above 95 percent of the catalyst is separated by gravity alone from the low velocity gas stream. The superficial gas velocity through the bed in vessel 30C may vary from about 0.3 to 2.0 ft./sec. and catalyst density from about 20 to 42 lbs./cu. ft. with the presently used hydroforming catalysts; however, limits of 0.3 to 1.0 ft./sec. and 30 to 39 lbs./cu. ft. are recommended. The range of suitable gas velocities and catalyst densities for reactor 18 is the same. In this connection, it is well to note that the density of the bed must be coordinated with the depth and elevation of the bed to provide a sufficient fluistatic head for return of catalyst to the hydroforming reactor. There is no substantial variation of the regeneration temperature from 1100° F. in any of the three principal zones of regenerator 30.

The regenerated catalyst which accumulates in 30C is returned from the bed in which the pressure is 506.7 p. s. i. g. through draw-off well 62 down the 2½ inch transfer line 64 through safety valve 66 and control valve 68 into the lower portion of reactor 18. The point of entry into the hydroformer should be spaced 90 degrees from any draw-off well therein at approximately the same level in order to avoid short-circuiting of the regenerated catalyst to the spent catalyst draw-off well. Air or another suitable aeration medium is introduced into line 64 at the rate of 3 lbs./hr. to maintain the catalyst in a fluidized state in order that a gravity or fluistatic pressure head may be developed in line 64 whereby the pressure is raised from 506.7 to 519.9 p. s. i. g. immediately above valve 66 when the density in line 64 is 39 lbs./cu. ft. This provides the pressure necessary to overcome the 5.4 p. s. i. pressure drop across valves 66 and 68 and introduce the catalyst into the hydroformer against a pressure of 514.5 p. s. i. g. Under average conditions 7530 lbs./hr. of catalyst pass through transfer line 64 at an average velocity of 2.0 ft./sec. The velocity of the dense phase catalyst in transfer lines 32 and 64 should be kept below about 8 ft./sec. to minimize erosion of the slide valves in these lines. For most of their lengths, these pipes must be inclined to the horizontal at an angle greater than the angle of repose of the aerated fluidized solids in order to maintain a smooth steady flow of catalyst. Generally the angle must be at least 30 degrees but angles of 45 degrees or more with the horizontal are recommended. Short sections, say several feet, of these transfer lines may be inclined less or even horizontal, but this practice is not recommended as the aeration gas tends to separate from the solids at such points.

Valve 66 is a safety valve which operates similarly to valve 50 in response to a conventional pressure differential controller (not shown) to shut off the flow of catalyst and prevent back flow of hydrocarbon gases from reactor to regenerator section 30C whenever the pressure drop across valves 66 and 68 is less than about 3.0 p. s. i. In routine operation the flow of catalyst is entirely controlled by valve 68, which like valves 50, 52 and 66, is a slide valve. This valve 68 may be automatically controlled in response to fluctuations of a selected reaction condition, and it is preferred to operate this valve in response to fluctuations in the level of interface 60. This is accomplished by a differential pressure controller (not shown) provided with pressure connections to points above and below the level shown. This controller operates to reduce the flow through valve 68 when the level in the upper bed of vessel 30C tends to drop below the level shown at 60 and to open valve 68 more when the level rises above that shown in the drawing.

It will be observed that the system described herein circulates catalyst through the reactor to regenerator transfer line 32 and the regenerator to reactor return line 64 solely by balancing static pressure, including gravity or fluistatic pressures, in the system. Thus, the partially spent catalyst is transferred by gravity alone or aided by a small pressure differential to the regenerator where the regeneration gases reactivate it and carry it to the upper bed in section 30C from which it is returned by gravity alone to a zone of somewhat higher pressure in hydroforming reaction bed. Thus the contact material is never in contact with any pump or other device containing moving parts. This is very desirable, inasmuch as the contact material is of a highly abrasive nature. The effect of the force of gravity in developing fluistatic or pseudo-liquid pressures in beds and columns of aerated powdered catalyst is well known. In the present system such pressures are obtained by locating various elements of the hydroforming system at the relative elevations listed hereinbelow:

*Table 1*

| Regenerator 30: | Elevation in feet above datum plane |
|---|---|
| Combustion chamber 30A: | |
|   Lower knuckle radius | [1] 0 |
|   Inlet of line 32 | 2 |
|   Bottom of tapered section | 5 |
| Carrier line 30B: | |
|   Bottom | 10 |
|   Top | 57 |
| Separation chamber 30C: | |
|   Lower knuckle radius 54 | 61 |
|   Interface 60 | 81 |
|   Upper knuckle radius | 98 |
| Reactor 18: | |
|   Lower knuckle radius | 8 |
|   Inlet of line 64 | 10 |
|   Interface 22 | 63½ |
|   Upper knuckle radius | 78½ |

[1] Datum plane.

To maintain the controlled pressures in the catalyst circulatory system, a differential pressure controller 70 is provided which is connected to the tops of the regenerator and the reactor. Pressure controller 70 regulates the pressure differential between these two vessels by controlling the passage of regeneration flue gas through regulating valve 72 in exhaust line 74.

Where it is desired to employ a fluidized conversion catalyst other than that disclosed herein, suitable adjustment of gas velocities, densities, equipment elevations or static pressures at various points may be made according to the principles of the present invention to maintain the catalyst circulation required for the particular catalyst.

In cases where the catalyst circulation rate is low, stripping of either the partially spent or the regenerated catalyst is not considered worthwhile. However, means for stripping the deactivated contact material in either one or more of the draw-off wells in reactor 18 or in a separate vessel with steam, recycled product gas or other suitable medium may be readily installed. The regenerated catalyst may be similarly stripped with steam, absorber tail gas or other appropriate stripping fluid.

The regeneration gases leave the disengaging or settling zone at the top of chamber 30C through porous filters 56 which remove all entrained catalyst fines from the dilute phase. From the filters, these flue gases pass through pipes 76 and passages in automatic time cycle controller 78, of known construction, into line 80. As fine particles build up on filters 56 they gradually restrict flow through the filters; hence, it is necessary to blow gas back through the filters occasionally to preserve their filtering efficiency. This blow-back operation with flue gas from line 82 is governed by the valve arrangement in controller 78 in such manner as to blow gas backward through each of the filters in sequence. It is recommended that while one filter is being cleared by blow-back at any given instant, the remaining filters continue to filter the regeneration flue gas. Line 80 conducts 110,344 lbs./hr. (3621 M. P. H.) of regeneration gas to waste heat boiler 84 where the temperature of the flue gas is lowered from 1100° F. to 650° F. In giving up this heat 13,500 lbs./hr. of water at 240° F. and 525 p. s. i. g. from drum 86 is converted into 525 p. s. i. g. steam. The cooled flue gas leaves the boiler in line 88, and 4344 lbs./hr. of this gas on the average is exhausted from the system via valve 72 in line 74.

The remainder of the relatively cool flue gas passes through pipes 88, 90 and 92 to compressor 94 which raises the pressure from 495 to about 525 p. s. i. g. In event of breakage of one of the filters 56, compressor 94 would probably be subjected to extreme wear by abrasion from the catalyst fines in the flue gas passing through this compressor. To preclude this, an auxiliary filtering apparatus 96 is provided for just such emergencies. In this case, by suitable manipulation of the valves in lines 90 and 98, flue gas would be directed from pipe 88 through line 98, filtering apparatus 96 and line 100 to pipe 92. Pipe 102 is provided to supply high pressure air, from a source not shown, for clearing the filter in tank 96 by blow-back therethrough. The flue gas leaving compressor 94 via line 104 contains 1.9 mol percent of oxygen and is divided between lines 106 and 108. Pipe 106 carries 79,200 lbs./hr. (2600 M. P. H.), to the regenerator air supply line 58 from which the gas enters the regeneration tower 30. Line 108 conveys the blow-back portion of the recycle flue gas through blow-back heater 110 where the temperature of the gases is raised to 1100° F. in order to minimize thermal stresses in filters 56 in the blow-back operation. From this heater, the stream of blow-back gas, which amounts to 19,800 lbs./hr., is carried through line 82 to the blow-back valve system 78.

Returning now to the products of the hydroforming reaction, line 26 carries a mixture of gases, hydrocarbon vapors and entrained catalyst fines at 930° F. to heat exchanger 112 where it is cooled to 780° F. This effluent has a molecular weight of 31.1 and consists of 171,620 lbs./hr. of gases and vapors, in addition to the 680 lbs./hr. of fines entrained therein. From heat exchanger 112 the effluent passes through line 114 to the scrubber-fractionator 116. This piece of equipment contains an upper fractionation section 116A of conventional bubble plate construction with ten plates. The mid-section 116B consists of a scrubbing section in which all of the catalyst fines are scrubbed out by passage through curtains of the polymer liquid falling from one to another of the five inclined baffles in this section. At the bottom of the tower is a decanting or settling section 116C where the solid fines are settled out of the slurry descending from the scrubber above. The reaction products and fines are introduced from line 114 into the bottom of scrubber section 116B where the temperature is maintained at 575° F. and the pressure at 495 p. s. i. g. Only polymer is condensed out of the incoming gases in scrubber 116B for the temperature at the top of this scrubber is 505° F. This crude polymer is composed chiefly of branch chain aromatics along with about 15 percent by weight of gasoline or lighter materials. It boils well above the gasoline boiling range which is considered herein to extend from 100 to 400° F. at normal atmospheric pressure. For the purposes of the present invention the high boiling condensate used to scrub the catalyst fines out of the hydroformer products may have a gravity of from about 5 to 25° API and a boiling point from about 400 to 700° F. at atmospheric pressure at the time of leaving the bottom of scrubber 116B. For best results, this liquid effluent from the scrubber should have an API gravity between about 12 and 18 degrees. In the fractionator 116A the temperature drops from 505° F. at the bottom to 370° F. in the effluent gases passing through the overhead line 118; and here liquids having gravities of 30 to 45° API are condensed. 27,500 lbs./hr. of light liquid products (67.8° API) are introduced into the top of tower 116A at 100° F. from line 120. The source of this reflux liquid will be described hereinafter. From the bottom of the fractionator section 116A, 12,160 lbs./hr. of an oil with a gravity of 38.0° API is withdrawn through line 122 and pump 124. The stream emitted by the pump is divided equally between lines 126 and 128. The material passing through pipe 128 is cooled from 505 to 120° F. by cooler 130. The effluent from cooler 130 is passed via line 132 to various pumps used in the refining system. It is used as a high pressure lubricant and returned to the top of scrubbing section 116B in line 134. The oil in pipe 126 is employed as a high pressure flushing oil for the bearings of pumps 136 and 138 to prevent the catalyst fines in the abrasive slurries passing through said pumps from contacting friction surfaces of the pumps. This flushing oil passes to the interior of the pumps and joins the liquid being pumped therethrough. 3,040 lbs./hr. of this oil is supplied to each of the pumps. From the bottom 140 of scrubber 116B, the slurry of catalyst in the polymer (15.0° API gravity) is withdrawn through line 142 and split between pumps 136 and 138. 165,400 lbs./hr. of 15.0° API polymer along with 10,000 lbs./hr. of the catalyst fines is forced through line 144 to the reboiler 146 where its temperature is reduced from 572 to 425° F. The slurry returns to the top of scrubber 116B in pipe line 148. Meanwhile, 145,000 lbs./hr. of polymer plus 8750 pounds of solid fines are pumped by pump 138 via line 150 to a different reboiling heat exchanger 152. Here the temperature of the slurry is dropped from 572 to 475° F. and the cooled slurry is recirculated to the scrubber in line 154. All the catalyst fines are scrubbed from the hydroformer effluent gases by polymer condensing in section 116B, for substantially all of the 38.0° API fraction condensing in fractionator 116A is returned to the scrubber in tower 116 where all of its lighter components are vaporized and pass overhead. From the bottom 140 of scrubber 116B, a portion of this catalyst slurry descends into settling section 116C where the catalyst settles to the bottom and a thickened slurry of high solids content is drawn off in line 156 at the rate of 5460 lbs./hr. of the polymer along with 680 pounds per hour of catalyst at 575° F. and is returned to the hydroformer 18 by means of pump 158 and line 20. From the upper part of the settling section, a stream of polymer free of catalyst is removed from draw-off well 160 and passed through pipe 162 containing regulating valve 163 to the six-tray polymer flash tower 164 at the rate of 5810 lbs./hr.

The gasiform mixture taken overhead in line 118 at the rate of 257,850 lbs./hr. (6602 M. P. H.) has a molecular weight of 39.0. An increase in the molecular weight over the hydroformer effluent will be noted as a result of recycling the light liquid products in pipe 120 to the fractionator 116A. This overhead fraction is passed through heat exchanger 166 and cooler 168 to reduce its temperature from 370 to 100° F. on its way to separating drum 170 which is maintained at 480 p. s. i. g. The water and liquid hydrocarbons condensed in cooler 168 are separated from the remaining gases in separator 170. Water is drained off through line 172 at the rate of 84 lbs./hr. and the liquid hydrocarbons are withdrawn through line 174. These hydrocarbons are divided and the major portion is returned to the fractionating section 116A as reflux via pipe 176, pump 178 and line 120. The somewhat smaller remainder of the 67.8° API liquid hydrocarbons continues along line 174 at the rate of 74,096 lbs./hr. and is reheated by heat exchanger 180 from 99 to 317° F. which converts the stream into a mixture of liquid having a gravity of 60° API and vapor of 50.0 molecular weight. From pipe 182 this mixture is introduced via regulating valve 183 into the middle of a 30-plate stabilizer 184. The feed to the stabilizer consists of 12,500 lbs./hr. (250.0 M. P. H.) of vapor and 61,596 lbs./hr. of the liquid. The liquid descends down the plates of the stabilizing column with a gradual increase in temperature and is withdrawn from the bottom plate through line 186 at 385° F. as a 63.5° API liquid at the rate of 140,430 lbs./hr. and passed through reboiler 152 where it is converted into 75,000 lbs./hr. (930 M. P. H.) of vapor having a molecular weight of 80.8 and 65,430 lbs./hr. of a 52.0° API liquid. This mixture is reintroduced into the tower via line 188 below the bottom plate where the temperature is 433° F. and the pressure is 295 p. s. i. g. All of this vapor passes up the tower and all of the liquid is drained off through pipe 190 and passed through heat exchanger 180 which reduces its temperature to 170° F. and cooler 192 which further cools it to 105° F. This product is stabilized gasoline and is conducted to suitable storage facilities. The vapors ascending the tower are partially condensed and the overhead leaves at 135° F. at the rate of 47,666 lbs./hr. (1120 M. P. H.) in line 194. Cooler 196 reduces the temperature of the overhead to 100° F. to condense its heavier components and the material is conducted by pipe 198 to separator 200 where the pressure is maintained at 285 p. s. i. g. 39,000 lbs./hr. of liquid having a specific gravity of 0.506 is separated here and refluxed to the tower through line 202, pump 204 and pipe 206. The stabilizer gas has a molecular weight of 35.5 and is withdrawn through line 208 at the rate of 8666 lbs./hr. (243.7 M. P. H.) as a product of the process.

Returning now to separating drum 170, the gas withdrawn in line 210 at the rate of 86,170 lbs./hr. (4564 M. P. H.) is divided into three streams. One of the streams is passed through line 212 to accumulator 214. This portion of the gas is recycled via line 216, compressor 218, back to the hydroforming reactor at the rate of 77,790 lbs./hr. (4120 M. P. H.) This gas has a molecular weight of 18.9 and comprises essentially light hydrocarbon gases and vapors with a concentration of 29.2 mol percent of hydrogen. After passing through line 220, the temperature of the recycle gas is raised from 120 to 330° F. by heat exchanger 166. It then is conducted through pipe 222 and heat exchanger 112 where its temperature is further boosted to 705° F. Thereafter, this gas is conducted through line 224 to the furnace 10 and its temperature is raised to 1100° F. This recycle gas leaves the furnace in line 14 to enter the hydroformer feed line as previously described.

A second portion of the gas in line 210 is drawn off by line 226 and passes through the reducing valve 228 and line 230 on its way to the absorber 4 where the pressure is considerably lower than in drum 170. The remaining small portion of gas, 290 lbs./hr. (15.0 M. P. H.), passes from line 210 through pipe 232 and reducing valve 234 to the polymer flash tower 164 where it serves to strip the gasoline and lighter components from the 15° API polymer being flashed into the tower from line 162. The bottom of the tower is maintained at 85 p. s. i. g. and 515° F. and the descending polymer increases in gravity until it leaves through line 236 at the rate of 4750 lbs./hr. (330 B. P. D.) and a gravity of 12° API. This material is run through cooler 238 on its way to storage tanks and thereby cooled to 125° F. Vapors leave the top of flash tower 164 at the rate of 1350 lbs./hr. (32 M. P. H.) and temperature of 530° F. in line 240, which joins the 8089 lbs./hr. of lighter gases flowing through line 230. Alternatively, the light fraction may be stripped out of the crude polymer by introducing steam into the bottom of tower 164. In this case, a condenser (not shown) is installed in line 240 to condense both the steam and the stripped hydrocarbons which have an average gravity of 25 to 40° API. This hydrocarbon fraction contains well over 50 percent aromatics and requires no further processing; hence, it is drawn off separately from the aqueous condensate and pumped to gasoline storage tanks.

The hydrocarbon mixture in pipe 230 has a molecular weight of 20.9 and is introduced into absorber 4 at the rate of 9439 lbs./hr. (451 M. P. H.) where it is contacted by the descending naphtha feed. The absorber is equipped with 24 trays and the gas inlet is located below the 18th tray from the top. From the bottom tray of the stripping section, the enriched naphtha is withdrawn at the rate of 140,828 lbs./hr. with a temperature of 290° F. through line 242. This 59.4° API liquid is passed through reboiler 146 where it is converted into 52,000 lbs./hr. (566 M. P. H.) of vapor having a molecular weight of 91.7 and 88,828 lbs./hr. of a liquid of 49.8° API gravity. The vapor and liquid are returned to the tower through line 244. In the tower, all of this liquid which consists of naphtha enriched by absorbed gases leaves the bottom in line 6 as described previously. The absorber tail gas goes overhead in line 246 at a rate of 6511 lb./hr. (410 M. P. H.). It has an average molecular weight of 15.9 and chiefly consists of hydrogen and methane as a by-product of the process. This gas is customarily passed to storage tanks and employed either as a fuel or process gas.

Yields from the operation of the hydroforming unit described above are summarized in standard terms in the table below:

Table II

| | Volume Percent | Weight Percent | Mol. Wt. | °API | Oct. No. CFRM | Lbs./Hr. | B. P. D. |
|---|---|---|---|---|---|---|---|
| Naphtha feed | 100.0 | 100.0 | 143.0 | 48.5 | 25 | 85,900 | 7,500 |
| Dry gas | | 16.3 | 22.2 | | | 14,000 | |
| 100% C₄ gasoline | 79.2 | | 102.9 | 52.6 | 80 | 66,420 | 5,941 |
| Polymer | 4.4 | | 175.0 | 12.0 | | 4,750 | 330 |
| Carbon | | 0.85 | | | | 730 | |

The catalyst inventory for the system is 110 tons. Hydrogen production amounts to 162 cu. ft./bbl. naphtha charged and the recycle gas rate is 5000 cu. ft./bbl. of naphtha, the gas volumes both being measured at 60° F. and 760 mm. mercury pressure. The regeneration air is present in a reasonable excess over that required to regenerate the catalyst since it was calculated on a total carbon equivalent of 1.04 weight percent. The lean oil loss of 170 lbs./hr. of naphtha by evaporation from the top tray of absorber 4 is not included in the stated quantity of absorber tail gas although the gas actually includes this vaporized naphtha.

Since certain changes may be made in carrying out the above process without departing from the scope of the invention it is intended that all material contained in the above description shall be interpreted as illustrative and not in a limiting sense.

Having described my invention, what I claim as new and desire to secure by Letters Patent is:

1. A process for the catalytic conversion of hydrocarbons which comprises transporting at a relatively low velocity in a dense phase aerated condition essentially under the influence of static pressure a finely divided fluidized conversion catalyst bearing deactivating deposits from a dense phase conversion bed directly to a combustion zone, removing a major portion of the deactivating deposits therefrom in the combustion zone to regenerate the catalyst in a dense phase by combustion with a regeneration gas containing a relatively low proportion of oxygen which is supplied as a separate stream directly thereto and combustion is effected at a temperature below that at which the catalyst loses activity and at a superficial gas velocity below about 5 feet per second, increasing the superficial velocity of the resulting flue gas to above about 10 feet per second to provide a relatively dilute suspension, conveying the regenerated catalyst from the combustion zone to an elevated collection zone essentially by entrainment as a relatively dilute suspension in the flue gas at a superficial gas velocity above about 10 feet per second without a substantial decrease in temperature, separating the suspended catalyst from the flue gas in a large dense phase bed in the elevated collection zone essentially by decreasing the superficial gas velocity below that at which substantial entrainment of the catalyst occurs, returning the regenerated catalyst at a relatively low velocity essentially under the influence of static pressure in dense phase aerated condition from the large collection zone bed directly to the conversion bed, cooling a portion of the separated flue gas and mixing the cooled flue gas with air to form the regeneration gas.

2. A process for the catalytic conversion of hydrocarbons which comprises transporting at a relatively low velocity in a dense phase aerated condition essentially under the influence of static pressure a finely divided fluidized conversion catalyst bearing deactivating deposits from a dense phase conversion bed directly to a combustion zone, removing a major portion of the deactivating deposits therefrom in the combustion zone to regenerate the catalyst in a less dense phase by combustion with a regeneration gas containing a relatively low proportion of oxygen which is supplied as a separate stream directly thereto and combustion is effected at a temperature below that at which the catalyst loses activity and at a superficial gas velocity below about 5 feet per second, increasing the superficial velocity of the resulting flue gas to above about 10 feet per second to provide a relatively dilute suspension, conveying the regenerated catalyst from the combustion zone to an elevated collection zone essentially by entrainment as a relatively dilute suspension in the flue gas at a superficial gas velocity above about 10 feet per second without a substantial decrease in temperature, separating the suspended catalyst from the flue gas in a large dense phase bed in the elevated collection zone essentially by decreasing the superficial gas velocity below that at which substantial entrainment of the catalyst occurs, returning the regenerated catalyst at a relatively low velocity essentially under the influence of static pressure in dense phase aerated condition from the large collection zone bed directly to the conversion bed, cooling a portion of the separated flue gas and mixing the cooled flue gas with air to form the regeneration gas.

3. A process for the catalytic conversion of hydrocarbons which comprises transporting at a relatively low velocity in a dense phase aerated condition essentially under the influence of static pressure a finely divided fluidized conversion catalyst bearing deactivating deposits from a dense phase conversion bed directly to a combustion zone, removing a major portion of the deactivating deposits therefrom in the combustion zone to regenerate the catalyst in a less dense phase by combustion with a regeneration gas containing a relatively low proportion of oxygen which is supplied as a separate stream directly thereto and flows in the combustion zone at a superficial gas velocity below about 5 feet per second, increasing the superficial velocity of the resulting flue gas to above about 10 feet per second to provide a relatively dilute suspension, conveying the regenerated catalyst from the combustion zone to an elevated collection zone essentially by entrainment as a relatively dilute suspension in the flue gas at a superficial gas velocity above about 10 feet per second without a substantial decrease in temperature, separating the suspended catalyst from the flue gas in a large dense phase bed in the elevated collection zone essentially by decreasing the superficial gas velocity below that at which substantial entrainment of the catalyst occurs, returning the regenerated catalyst at a relatively low velocity essentially under the influence of static pressure in dense phase aerated condition from the large collection bed directly to the conversion bed, cooling a portion of the separated flue gas, and forming a regeneration gas by mixing sufficient cooled flue gas with air to maintain the combustion temperature below about 1150 degrees Fahrenheit.

4. A process for the catalytic conversion of hydrocarbons which comprises transporting at a relatively low velocity in a dense phase aerated condition essentially under the influence of static pressure a finely divided fluidized conversion catalyst bearing deactivating deposits from a dense phase conversion bed directly to a combustion zone, removing a major portion of the deactivating deposits therefrom in the combustion zone to regenerate the catalyst in a less dense phase by combustion with a regeneration gas containing a relatively low proportion of oxygen which is supplied as a separate stream directly thereto and flows in the combustion zone at a superficial gas velocity between about 1 and about 3 feet per second, increasing the superficial velocity of the resulting flue gas to between about 10 and about 30 feet per second to provide a relatively dilute suspension, conveying the regenerated catalyst from the combustion zone to an elevated collection zone essentially by entrainment as a relatively dilute suspension in the flue gas at a superficial gas velocity between about 10 and about 30 feet per second without a substantial decrease in temperature, separating the suspended catalyst from the flue gas in a large dense phase bed in the elevated collection zone essentially by decreasing the superficial gas velocity below about 1 foot per second, returning the regenerated catalyst at a relatively low velocity essentially under the influence of static pressure in dense phase aerated condition from the large collection bed directly to the conversion bed, cooling a portion of the separated flue gas, and forming a regeneration gas by mixing sufficient cooled flue gas with air to maintain the combustion temperature below about 1150 degrees Fahrenheit.

5. A process for the catalytic conversion of hydrocarbons which comprises transporting at a relatively low velocity in a dense phase aerated condition essentially under the influence of static pressure a finely divided fluidized conversion catalyst bearing deactivating deposits from a dense phase conversion bed directly to a combustion zone, removing a major portion of the deactivating deposits therefrom in the combustion zone to regenerate the catalyst in a less dense phase by combustion with a regeneration gas containing a relatively low proportion of oxygen which is supplied as a separate stream directly thereto and flows in the combustion zone at a superficial gas velocity below about 5 feet per second, increasing the superficial velocity of the resulting flue gas to above about 10 feet per second to provide a relatively dilute suspension, conveying the regenerated catalyst from the combustion zone to an elevated collection zone essentially by entrainment as a relatively dilute suspension in the flue gas at a superficial gas velocity above about 10 feet per second without a substantial decrease in temperature, separating the suspended catalyst from the flue gas in a large dense phase bed in the elevated collection zone essentially by decreasing the superficial gas velocity below that at which substantial entrainment of the catalyst occurs, returning the regenerated catalyst at a relatively low velocity essentially under the influence of static pressure in dense phase aerated condition from the large collection bed directly to the conversion bed, cooling a portion of the flue gas, and forming the regeneration gas by mixing with air a quantity of cooled flue gas regulated in response to the combustion temperature to maintain a substantially constant combustion temperature between about 750 and about 1150 degrees Fahrenheit.

6. A catalytic hydrocarbon conversion system which comprises a conversion vessel means containing a dense phase bed of finely divided fluidized conversion catalyst which is partially deactivated by substances deposited thereon during the conversion of hydrocarbons, transfer means for carrying a dense phase aerated catalyst bearing deactivated deposits directly from the conversion vessel means to a combustion vessel means essentially under the influence of static pressure, means for supplying a regeneration gas of relatively low oxygen content directly to the combustion vessel means, a combustion vessel means of sufficient volume and cross-sectional area such that at least a major portion of the deactivating deposits are removed from the catalyst by combustion in a dense phase, a vertical transport means superimposed on the combustion vessel means and in open communication therewith having a cross-sectional area sufficient to provide a superficial flue gas velocity above about 10 feet per second in order to transport the catalyst upwardly from the combustion vessel means essentially by entrainment as a relatively dilute suspension in the flue gas without a substantial decrease in temperature, a vertical collection means superimposed on said transport means and in open communication therewith having a cross-sectional area of such size that a large dense phase of catalyst is maintained therein and a substantial amount of the entrained catalyst in the flue gas is separated by decreasing the superficial gas velocity to a point at which this occurs, a second transfer means for flowing regenerated catalyst as an aerated dense phase directly from the collection means to the conversion vessel means essentially under the influence of static pressure, means for cooling a portion of the separated flue gas and means for mixing the cooled flue gas with air to form the regeneration gas.

7. A reforming process which comprises flowing at a relatively low velocity in a dense phase aerated condition essentially under the influence of static pressure a finely divided fluidized catalyst comprising molybdenum oxide contaminated with carbonaceous deposits from a dense phase bed in a reforming zone directly to a regeneration zone, removing at least a major portion of the contaminating deposits therefrom in the regeneration zone to regenerate the catalyst in the dense phase by combustion with a regeneration gas containing a relatively low proportion of oxygen which is supplied as a separate stream directly thereto and combustion is effected at a temperature below that at which the catalyst loses activity at a significant rate and at a superficial gas velocity below about 5 feet per second, increasing the superficial velocity of the resulting flue gas to above about 10 feet per second, conveying the regenerated catalyst from the combustion zone to an elevated collection zone essentially by entrainment as a relatively dilute suspension in the flue gas at a superficial gas velocity above about 10 feet per second without a substantial decrease in temperature, separating the suspended catalyst from the flue gas in a large dense phase bed in the collection zone essentially by decreasing the superficial gas velocity below that at which substantial entrainment of the catalyst occurs, returning the regenerated catalyst at a relatively low velocity essentially under the influence of static pressure in a dense phase aerated condition directly from the large collection zone bed to the dense bed in the reforming zone, cooling a portion of the separated flue gas and mixing the cooled flue gas with air to form the regeneration gas.

8. A reforming process which comprises passing at a relatively low velocity in a dense phase aerated condition essentially under the influence of static pressure a finely divided fluidized catalyst contaminated with carbonaceous deposits from a dense fluidized bed in a reforming bed directly to a regeneration zone, removing carbonaceous deposits from the catalyst in the regeneration zone under dense phase conditions by combustion with a regeneration gas containing a relatively low proportion of oxygen and which is supplied as a separate stream directly thereto at a superficial gas velocity below about 5 feet per second, increasing the superficial gas velocity of the resulting flue gas to above about 10 feet per second to provide a relatively dilute suspension of catalyst, conveying the regenerated catalyst from the regeneration zone to an elevated collection zone essentially by entrainment as a relatively dilute suspension in the flue gas at a superficial gas velocity above about 10 feet per second without a substantial decrease in temperature, separating the suspended catalyst from the flue gas as a dense fluidized bed in the collection zone essentially by decreasing the superficial gas velocity below the point at which substantial entrainment of the catalyst occurs, returning the regenerated catalyst at a relatively low velocity essentially under the influence of static pressure in a dense phase aerated condition directly from the collection zone bed to the dense bed in the reforming zone, cooling a portion of the separated flue gas and mixing the cooled flue gas with air to form the regeneration gas.

9. A catalytic hydrocarbon conversion system which comprises a conversion means adapted to contain a dense phase bed of finely divided fluidized conversion catalyst which is partially deactivated by carbonaceous material deposited thereon during the conversion of the hydrocarbon, a combustion means of sufficient volume and cross-sectional area such that a major portion of the deactivating deposits are removed from the catalyst through combustion in a dense phase condition, transfer means adapted to transport dense phase aerated catalyst bearing the deactivating deposits directly from the conversion means to the combustion means essentially under the influence of static pressure, means for supplying a regeneration gas of relatively low oxygen content, a transition means adjoining the combustion means and provided with an outlet of sufficiently smaller cross-sectional area than its inlet to accelerate the flue gas discharging from the combustion means to a superficial linear velocity above about 10 feet per second for the purpose of entraining catalyst, a transport means superimposed on said transition means having a cross-sectional area sufficient to maintain the superficial linear velocity of the flue gas above about 10 feet per second without a substantial decrease in temperature, a collection means superimposed on said transport means having a cross-sectional area of a size sufficient to separate catalyst from the flue gas as a dense fluidized mass essentially by decreasing the superficial gas velocity below the point of substantial entrainment, a second transfer means adapted for transporting regenerated catalyst directly from the collection means to the conversion means as a dense fluidized mass and essentially under the influence of static pressure, means for cooling a portion of the separated flue gas and means for mixing the cooled flue gas with air to form the regeneration gas.

10. The system of claim 9 wherein the collection means is further characterized by being situated at a substantially higher elevation than the conversion means.

11. The system of claim 9 which is further characterized by providing means for forming the regeneration gas through mixing of air with a quantity of cooled flue gas which is regulated in response to the combustion temperature in the combustion means maintained at a temperature between about 750° to 1150° F.

References Cited in the file of this patent

UNITED STATES PATENTS

| | | |
|---|---|---|
| 2,369,523 | Belchetz | Feb. 13, 1945 |
| 2,393,839 | Thomas et al. | Jan. 29, 1946 |
| 2,410,284 | Gunness et al. | Oct. 29, 1946 |
| 2,472,844 | Munday et al. | June 14, 1949 |
| 2,520,983 | Wilcox | Sept. 5, 1950 |
| 2,585,238 | Gerhold | Feb. 12, 1952 |
| 2,696,461 | Howard | Dec. 7, 1954 |